US006296101B1

(12) United States Patent
Hasegawa et al.

(10) Patent No.: US 6,296,101 B1
(45) Date of Patent: Oct. 2, 2001

(54) TOKEN MANAGEMENT SYSTEM FOR AMUSEMENT ARCADE

(75) Inventors: Kazutoyo Hasegawa, Shibata; Junichi Yamagishi, Sendai, both of (JP)

(73) Assignee: Unirec Co., Ltd., Tokyo (JP)

( * ) Notice: Subject to any disclaimer, the term of this patent is extended or adjusted under 35 U.S.C. 154(b) by 0 days.

(21) Appl. No.: 09/495,749

(22) Filed: Feb. 1, 2000

(51) Int. Cl.[7] .............................. G06F 19/00; G07D 9/00; G07B 15/00

(52) U.S. Cl. .............................. 194/217; 453/17; 232/16; 340/5.4

(58) Field of Search ......................... 453/17, 32; 194/217, 194/350; 232/15, 16; 340/5.4, 5.41, 5.42, 5.91, 5.92

(56) References Cited

U.S. PATENT DOCUMENTS

| | | | | |
|---|---|---|---|---|
| 3,961,744 | * | 6/1976 | Kashuba, Jr. | 232/16 |
| 4,729,509 | * | 3/1988 | Diekhoff | 232/16 |
| 4,907,250 | * | 3/1990 | Ricks | 194/217 |
| 5,222,583 | * | 6/1993 | Bergmann et al. | 194/206 |
| 5,259,491 | * | 11/1993 | Ward, II | 194/350 |
| 5,477,952 | * | 12/1995 | Castellano et al. | 194/200 |
| 6,085,888 | * | 7/2000 | Tedesco et al. | 194/217 |
| 6,125,988 | * | 10/2000 | Waters | 194/217 |

FOREIGN PATENT DOCUMENTS

| | | |
|---|---|---|
| 06259444 | 9/1994 | (JP) . |
| 06312061 | 11/1994 | (JP) . |

* cited by examiner

*Primary Examiner*—Robert P. Olszewski
*Assistant Examiner*—Bryan Jaketic
(74) *Attorney, Agent, or Firm*—Christopher J. Chan; Roger T. Frost; Kilpatrick Stockton

(57) ABSTRACT

A token management system for a amusement arcade is capable of always managing tokens even during the business hours of the amusement arcade and temporarily keeping tokens deposited by players.

The system has wireless account units and a collecting cart. The wireless account unit is provided for each of game machines and token dispensing machines installed in the amusement arcade, for detecting the number of tokens or coins inserted into a slot of the machine and the number of tokens or coins returned to players through a return mouth of the machine and transmitting the detected numbers to a wireless account unit attached to a management computer of the amusement arcade. Each of the wireless account units is provided with an identification number specific to the corresponding machine. The collecting cart collects tokens and coins from the game machines and token dispensing machines. The collecting cart has a counter for counting the number of tokens or coins at each of the game machines and token dispensing machines and a wireless account unit provided with a function for comparing the counted number with count data transmitted from the corresponding machine. With these components, the system determines whether or not tokens or coins are excessive or insufficient for each of the game machines and token dispensing machines according to data transmitted from the machines and whether or not there are losses of tokens or coins according to data transmitted from the collecting cart.

5 Claims, 5 Drawing Sheets

TOKEN MANAGEMENT SYSTEM FOR AMUSEMENT ARCADE

BACKGROUND OF THE INVENTION

1. Field of the Invention

The present invention relates to a token/coin management system for amusement arcades having game machines played with tokens, for totally controlling tokens stocked at each amusement arcade and each game machine, the operating conditions of each game machine, tokens distributed through the amusement arcades, tokens temporarily kept for players, coins stocked at each token dispensing machine, etc.

2. Description of the Prior Art

Token/coin management systems for game machines are not so advanced yet. They generally collect tokens from each game machine and each token dispensing machine with collecting devices, count the number of tokens at each game machine, record the counted number on, for example, a memo pad, gather counted numbers from all game machines and token dispensing machines, and enter the gathered numbers into a computer.

The "tokens" used to play with game machines are coin-like metal objects developed for use with only game machines installed in amusement arcades. The amusement arcades must manage the tokens as well as coins inserted into token dispensing machines.

The conventional token management systems grasp the stock of tokens and coins only after the closure of a amusement arcade and are incapable of obtaining the situations of tokens distributed through game machines while the amusement arcade is open.

A player may ask the amusement arcade to keep his or her surplus tokens. It is difficult for the conventional systems to identify the player who asked for keeping surplus tokens. The conventional systems may let a player use tokens deposited by another player. Namely, the conventional systems are unable to check the illegal use of tokens deposited by players.

SUMMARY OF THE INVENTION

An object of the present invention is to provide a token management system that solves the problems of the prior arts and is capable of grasping the situations of tokens in each game machine and each token dispensing machine installed in a amusement arcade even during the operation of the machines, detecting a loss of tokens collected by a collecting device, and temporarily keeping players' surplus tokens with players' identification data.

In order to accomplish the object, a first aspect of the present invention provides a token management system for a amusement arcade, having wireless account units and a collecting cart. The wireless account unit is provided for each of game machines and token dispensing machines installed in the amusement arcade, for detecting the number of tokens or coins inserted into a slot of the machine and the number of tokens or coins returned to players through a return mouth of the machine and transmitting the detected numbers to a wireless account unit attached to a management computer of the amusement arcade. Each of the wireless account units is provided with an identification number specific to the corresponding machine. The collecting cart collects tokens and coins from the game machines and token dispensing machines. The collecting cart has a counter for counting the number of tokens or coins at each of the game machines and token dispensing machines and a wireless account unit provided with a function for comparing the counted number with count data transmitted from the corresponding machine. With these components, the system determines whether or not tokens or coins are excessive or insufficient for each of the game machines and token dispensing machines according to data transmitted from the machines and whether or not there are losses of tokens or coins according to data transmitted from the collecting cart.

A second aspect of the present invention provides each of the game machines and token dispensing machines with a bar code representing an identification number specific to the machine, and the collecting cart with a bar-code reader. The bar-code reader reads the identification number of a given game machine or token dispensing machine, and according to the read identification number, the collecting cart automatically receives, through wireless communication, count data from the given machine.

A third aspect of the present invention provides a token management system for a amusement arcade having a token keep/return unit, game machines, token dispensing machines, and a management computer.

The token keep/return unit has a function for accepting tokens deposited by a player, a function for temporarily keeping the accepted tokens, and a function for returning the kept tokens to the player.

Each of the game machines and token dispensing machines has a wireless account unit for detecting the number of tokens or coins inserted into a slot of the machine and the number of tokens or coins returned to players through a return mouth of the machine and transmitting the detected numbers to a wireless account unit attached to a management computer of the amusement arcade. The wireless account unit is provided with an identification number specific to the corresponding machine.

The management computer is connected to the token keep/return unit through a communication link. The management computer transmits the identification number of any one of the game machines and token dispensing machines, receives the number of tokens or coins counted at the machine that has the transmitted identification number, checks the received number, issues an instruction to replenish the machine with tokens if the received number is below a predetermined level, and issues an instruction to extract tokens from the machine if the received number is above a predetermined level.

A fourth aspect of the present invention provides the token keep/return unit with an input unit for entering an identification number related to a player who deposits surplus tokens and a fingerprint recognition unit for scanning and reading a fingerprint of the player. The entered identification number and read fingerprint are transmitted to the management computer.

To return the deposited tokens to the player, the player enters the identification number through the input unit. The system retrieves the fingerprint from the management computer according to the entered identification number, and if the retrieved fingerprint agrees with a fingerprint of the player presently read by the fingerprint recognition unit, the system returns the deposited tokens to the player.

A fifth aspect of the present invention installs management computers in amusement arcades, respectively, and connects the management computers to one another through a communication network to centrally control tokens deposited by players to enable each player to deposit and receive tokens at any one of the amusement arcades through fingerprint identification.

According to the first aspect, the wireless account unit of each game machine or token dispensing machine transmits the number of tokens or coins deposited or dispensed at the machine to the management computer so that the management computer may acquire the availability of each machine as well as the number of tokens or coins held by each machine. The management computer may issue an instruction to supply tokens to any game machine or token dispensing machine that is short of tokens, or an instruction to extract tokens from any game machine or token dispensing machine that holds excessive tokens.

After the amusement arcade is closed, the collecting cart is used to collect tokens and coins from each of the game machines and token dispensing machines. The collecting cart has the counter. When collecting tokens from a game machine or token dispensing machine, the collecting cart enters an identification number specific to the machine and fetches count data from the machine. The collecting cart counts the number of tokens or coins of the machine with the use of the counter, compares the counted number with the fetched count data, and quickly finds out a difference between them, if any. Before the amusement arcade is opened, the management computer has latest data about tokens held by each game machine or token dispensing machine, and according to the data, determines whether or not the machine has a sufficient number of tokens. This determination may be made even during the business hours of the amusement arcade.

According to the second aspect, an operator of the amusement arcade is not required to enter identification data for a game machine or token dispensing machine. The operator only scans a bar code attached to the machine with the bar-code reader installed on the collecting cart. Then, the wireless account unit of the collecting cart transmits the read identification number and fetches data about the number of tokens or coins from the machine.

According to the third aspect, the amusement arcade is provided with the token keep/return unit to deal with players' surplus tokens. The token keep/return unit receives and counts surplus tokens deposited by a player and registers the counted number with identification data related to the player in the management computer. The deposited tokens will be returned to the player when the player visits the amusement arcade within a predetermined period and requests the returning of the deposited tokens. This enables players to play games with deposited tokens anytime within a predetermined period.

The management computer stores the number of tokens held by each game machine or token dispensing machine daily at the opening of the amusement arcade.

Thereafter, the management computer receives token data from the wireless account unit of each game machine or token dispensing machine from time to time and determines whether a hopper of the machine is excessively filled with tokens or is short of tokens. If tokens in the hopper are less than a lower limit, the management computer issues an instruction to supply tokens to the hopper, and if they are above an upper limit, an instruction to extract tokens from the hopper. As a result, each game machine or token dispensing machine is available for a player always with a proper number of tokens.

According to the fourth aspect, the token keep/return unit is provided with the identification number input unit and fingerprint recognition unit. When asking to temporarily keep surplus tokens, a player enters his or her identification number into the input unit. The identification number and fingerprint data scanned by the fingerprint recognition unit are stored in the management computer. To ask for returning the kept tokens, the player enters the identification number into the input unit. According to the entered identification number, the management computer retrieves related fingerprint data, and the fingerprint recognition unit checks to see if the retrieved fingerprint data agrees with a fingerprint scanned from the player who is asking for returning the kept tokens. This arrangement enables only a right player to receive deposited tokens.

According to the fifth aspect, the management computers of amusement arcades are connected to one another through a communication network so that player identification data, data about tokens kept for players, and fingerprint data are shared among the management computers. A player may enter his or her identification number and fingerprint at any one of the amusement arcades, and the fingerprint recognition unit at the amusement arcade checks to see if the fingerprint agrees with fingerprint data stored in the management computer. If they agree with each other, the player may receive deposited tokens. In this way, players can play at any one of the amusement arcades.

DETAILED DESCRIPTION OF THE EMBODIMENTS

First embodiment

Figure 1:
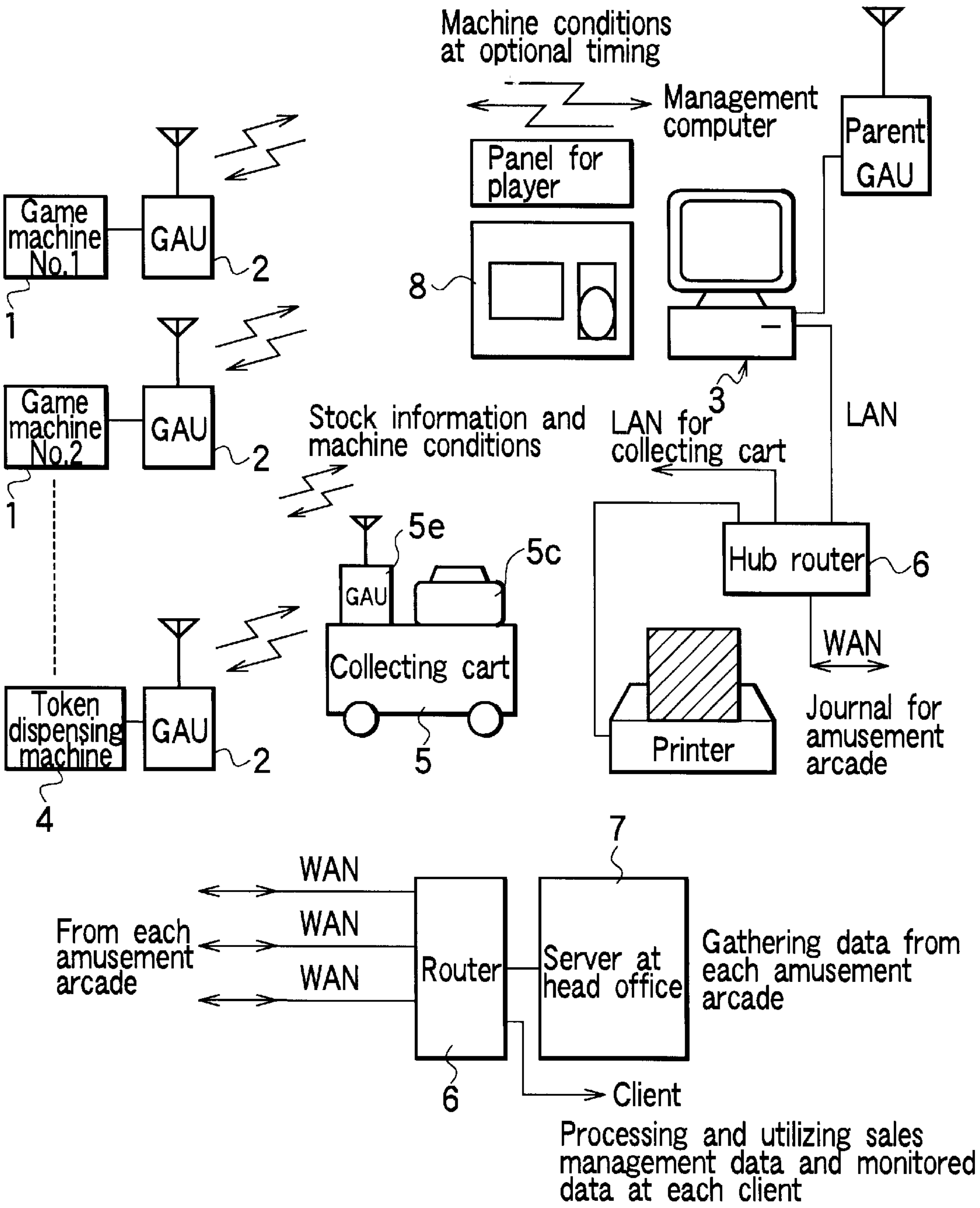
FIG. 1 shows a token management system according to a first embodiment of the present invention.
Figure 2:
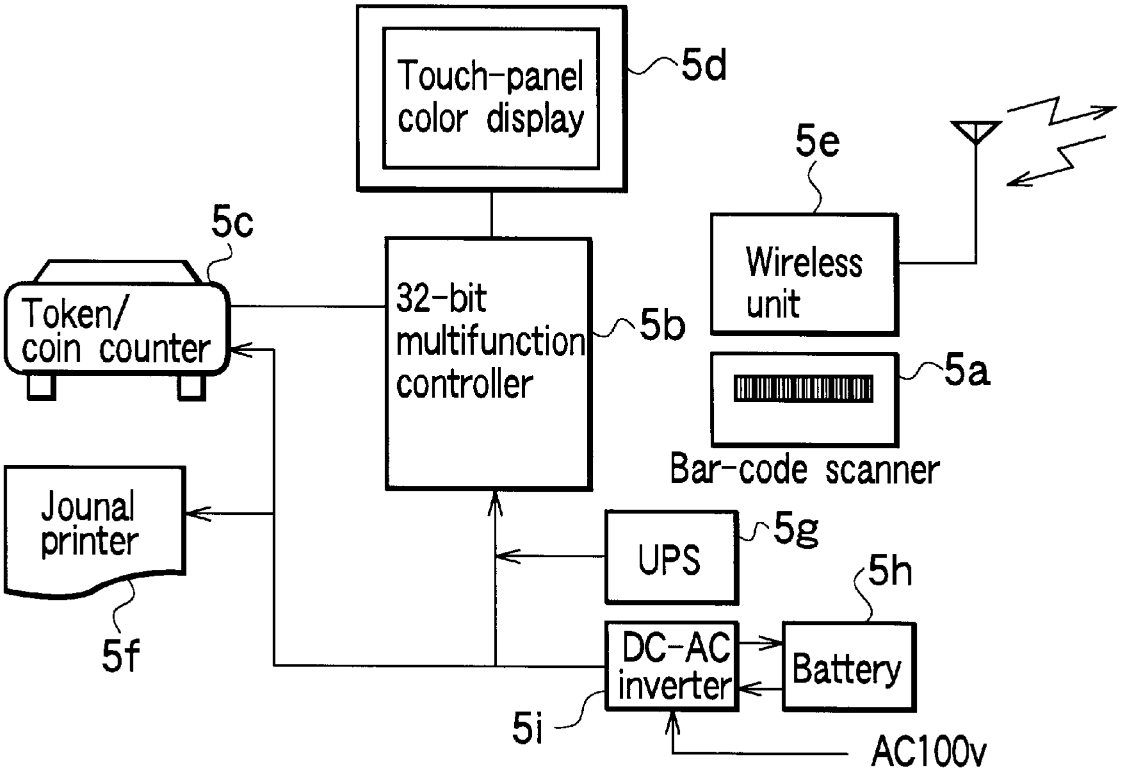
FIG. 2 is a block diagram showing a collecting cart according to the first embodiment.

FIG. 1 shows a token management system for a amusement arcade according to the first embodiment of the present invention and FIG. 2 shows a collecting cart used for the system.

In FIG. 1, a amusement arcade has game machines 1 played with tokens. Each game machine 1 has a slot for inserting tokens and a return mouth for returning tokens. The slot and return mouth have each a sensor for counting the number of inserted or returned tokens. Each game machine 1 has a wireless account unit 2 (denoted as "GAU" through the accompanying drawings) to communicate with a wireless account unit attached to a management computer 3 installed in the amusement arcade. The amusement arcade also has a token dispensing machine 4, which has a function for counting the number of dispensed tokens and a wireless account unit 2 linked to the computer 3. In response to a count instruction from the computer 3, each of the game machines 1 and token dispensing machines 4 transmits the number of tokens counted thereby. Each wireless account unit 2 recognizes an identification number assigned to the corresponding game machine 1 or token dispensing machine 4 and transmits the identification number to the computer 3. The computer 3 is connected to a router 6 having a hub. Through a wide area network (WAN), the router 6 is connected to a server 7 installed in a head office that controls amusement arcades each having the management computer 3.

The management computers 3 of amusement arcades transmit identification data, token data, and fingerprint data to the server 7 in real time. At the same time, the server 7 transmits identification data, token data, and fingerprint data for all players who play at any one of the amusement arcades, to the amusement arcades in real time.

After the amusement arcade is closed, a collecting cart 5 collects tokens from the game machines 1 and token dispensing machines 4. FIG. 2 shows the details of the collecting cart 5. Each of the game machines 1 and token dispensing machines 4 is provided with a specific bar code for identifying the machine. The collecting cart 5 has a bar-code scanner 5*a* for reading the bar code of a game machine 1 or token dispensing machine 4, a multifunction controller 5*b* connected to the scanner 5*a,* a counter 5*c* for counting tokens or coins collected from a game machine 1 or token dispensing machine 4, a counter 5*c* connected to the multifunction controller 5*b,* a touch-panel display 5*d* for displaying commands for the controller 5*b* and count values, a wireless account unit 5*e* for transmitting the count values to the computer 3, and a journal printer 5*f* for outputting the count values. The collecting cart 5 also has an uninterruptible power supply system 5*g,* a battery 5*h,* and a DC-AC inverter 5*i.* The counter 5*c* has a function for switching a coin counting mode and a token counting mode from one to the other.

The computer 3 transmits an identification number to the game machines 1 and token dispensing machines 4 through the wireless account unit 2 thereof. The game machine 1 or token dispensing machine 4 having the transmitted identification number receives the identification number through the wireless account unit 2 thereof and transmits the number of tokens or coins counted thereby to the computer 3. In this way, the computer 3 gathers data about the numbers of tokens and coins from all game machines 1 and token dispensing machines 4. The computer 3 is capable of grasping the numbers of tokens and coins presently held by the game machines 1 and token dispensing machines 4, determining whether the game machines 1 and token dispensing machines 4 are in excess or short of tokens, and knowing the availability of each game machine 1 and token dispensing machine 4.

After the amusement arcade is closed, the collecting cart 5 is driven to collect tokens and coins from each of the game machines 1 and token dispensing machines 4. At a given machine 1 or 4, the collecting cart 5 uses the scanner 5*a* to read an identification number from the bar code attached to the machine, and transmits the read identification number to the machine. The machine having the transmitted identification number returns the number of tokens or coins counted thereby to the wireless unit 5*c* of the collecting cart 5. An operator of the collecting cart 5 collects tokens or coins from the machine and puts them into the counter 5*c,* which counts the number of the tokens or coins. The counted number is compared with the count data transmitted from the machine.

Then, the operator checks to see if the number of the collected tokens or coins is equal to the transmitted data so that the operator may collect all tokens or coins from the machine without fail.

A result of the collection of tokens or coins is transmitted from the collecting cart 5 to the computer 3 through the wireless unit 5*e.*

According to the transmitted data, the computer 3 determines whether or not the collected tokens or coins are correct. If they are short, the computer 3 transmits a warning to the operator of the collecting cart 5. In this way, the computer 3 may always monitor the behavior of the operator of the collecting cart 5 so that the operator may not wrongly collect tokens or coins.

The counter 5*c* of the collecting cart 5 is switchable to any one of the token counting mode and coin counting mode each of which is carried out in the same manner.

Second embodiment

Figure 3:
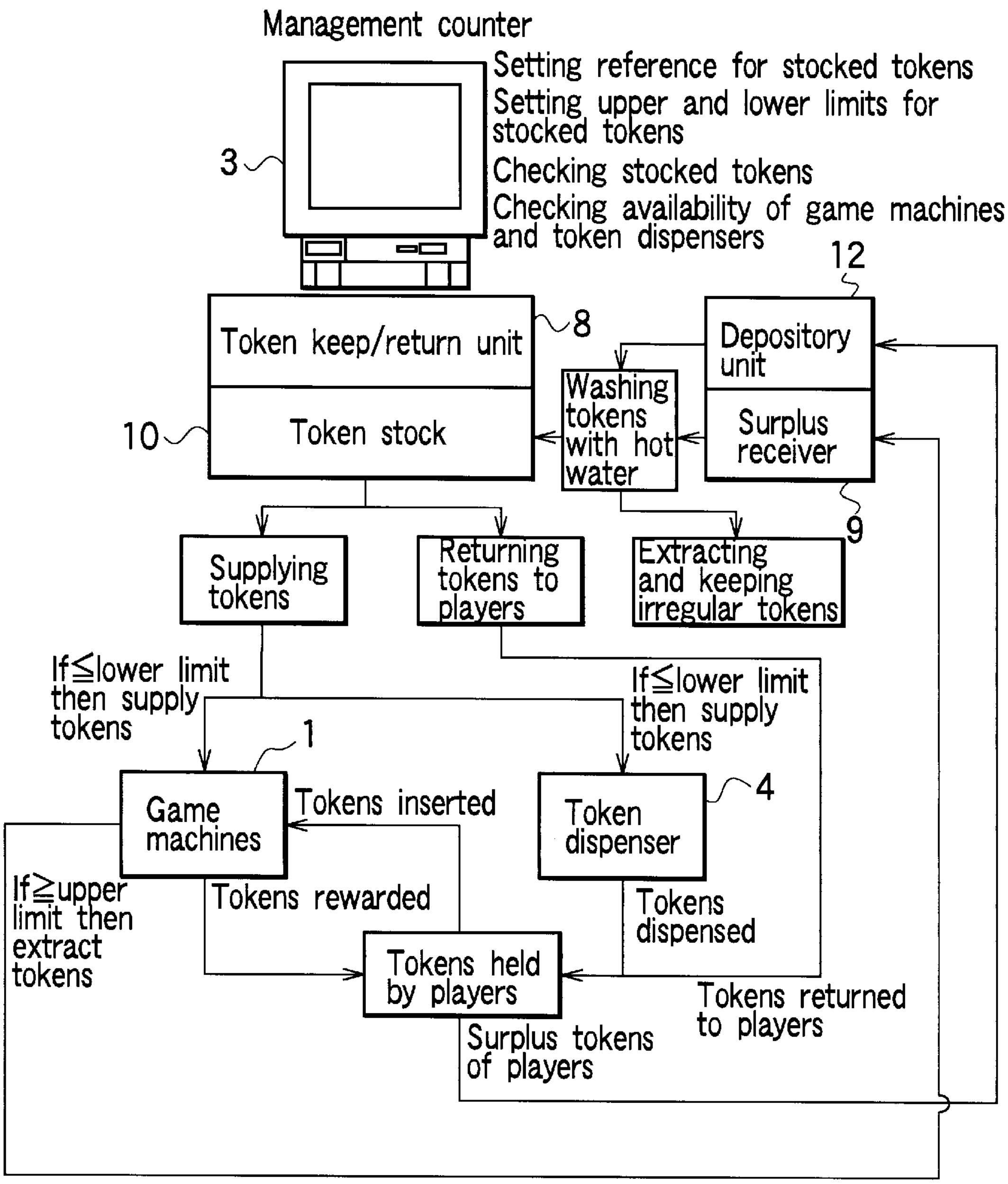
FIG. 3 is a flowchart showing the steps of managing tokens in a amusement arcade according to a second embodiment of the present invention.
Figure 4:
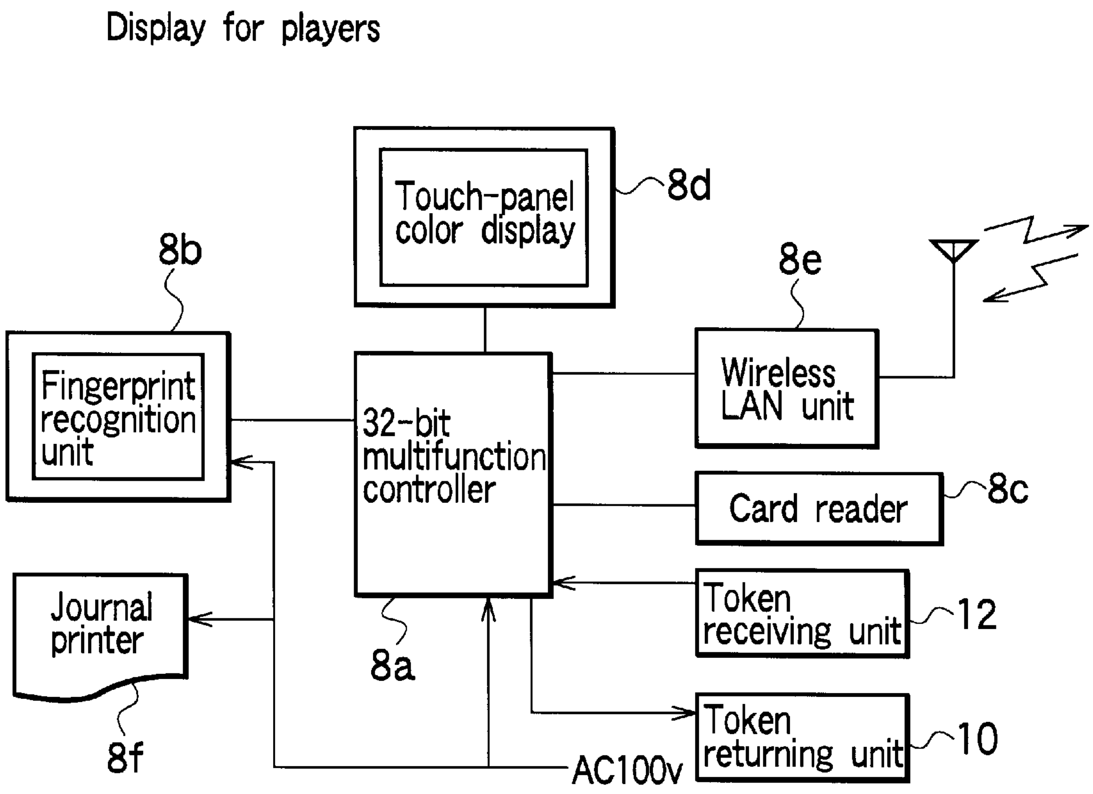
FIG. 4 is a block diagram showing a fingerprint recognition system according to the second embodiment.

FIGS. 3 and 4 show a token management system for a amusement arcade according to the second embodiment of the present invention. This system is not provided with the collecting cart 5 of FIG. 1. The system has a management computer 3, a depository unit 12, a surplus receiver 9, and a token keep/return unit 8. The depository unit 12 and surplus receiver 9 are connected to the computer 3 through a communication link. The token keep/return unit 8 is connected to the depository unit 12 through a communication link.

The token keep/return unit 8 includes a fingerprint recognition system of FIG. 4. The fingerprint recognition system has a 32-bit multifunction controller 8*a,* which is connected to a fingerprint recognition unit 8*b* for reading a fingerprint. The controller 8*a* is also connected to a card reader 8*c* for reading a magnetic card and a touch-panel color display 8*d.* The display 8*d* is used to enter personal information such as an identification number, telephone number, name, address, and age related to a player into a magnetic card set in the card reader 8*c.* Once a player enters personal information into a magnetic card through the display 8*d* and card reader 8*c,* a fingerprint of the player is read by the fingerprint recognition unit 8*b* and is transmitted with the personal information and the number of tokens deposited by the player to the computer 3 through a wireless LAN unit 8*e.* The computer 3 records the fingerprint and the number of tokens with the personal information as an index.

To return the deposited tokens to the player, the identification number of the player is entered into the system of FIG. 4 through the touch-panel display 8*d* or the card reader 8*c* and is transmitted to the computer 3. The computer 3 retrieves the fingerprint corresponding to the transmitted identification number and returns it to the system of FIG. 4. Then, the system of FIG. 4 checks to see if the returned fingerprint agrees with a fingerprint of the player presently read by the fingerprint recognition unit 8*b.*

Each player may enter his or her identification number with the use of any one of the card reader 8*c* and display 8*d* so that fingerprint data for the player is retrieved from the computer 3.

According to the second embodiment, the computer 3 controls all devices of a amusement arcade and manages all tokens in the amusement arcade, as indicated with flows of FIG. 3. Like the first embodiment of FIG. 1, the computer 3 uses a wireless account unit 2 to always monitor each of the game machines 1 and token dispensing machines 4 and determine whether tokens held by the machines are excessive or short. If the number of tokens held by a machine is below a lower limit (for example, 200), the computer 3 issues an instruction to supply tokens to the machine, and if it is above an upper limit (for example, 1400), an instruction to extract tokens from the machine.

The extracted tokens are transferred to the surplus receiver 9, which counts the number of the transferred tokens and informs the computer 3 of the counted number. The tokens transferred to the surplus receiver 9 are washed with, for example, hot water and are checked to see if they contain irregular tokens irrelevant to this amusement arcade. The number of such irregular tokens is informed to the computer 3, which deducts the same from the number of stocked tokens. Regular tokens are sent to a token stock 10 of the token keep/return unit 8.

A player who leaves the amusement arcade may have unused tokens. In this case, the player puts the tokens into the depository unit 12. The tokens are counted, and the counted number is informed to the computer 3 and token keep/return unit 8. Thereafter, the tokens are washed, irregular tokens are removed and counted, and regular tokens are stocked.

When receiving tokens from a player, the fingerprint recognition system of FIG. 4 is used. Personal information (identification number) related to the player is entered through the display 8*d* and is sent to the computer 3. At the same time, the personal information is written into a magnetic card set in the card reader 8*c*. The player puts a finger on the fingerprint recognition unit 8*b*, which reads the fingerprint of the finger and sends the fingerprint, the identification number, the number of deposited tokens to the computer 3. The computer 3 stores the sent data as player's identification data in a memory.

When withdrawing the deposited tokens, the player inserts the magnetic card into the card reader 8*c* or enters the identification number with the use of the display 8*d*. According to the identification number entered with the card reader 8*c* or display 8*d*, the controller 8*a* retrieves fingerprint data from the computer 3. The player is prompted to put his or her finger on the fingerprint recognition unit 8*b*, which reads the fingerprint of the finger and determines whether or not the read fingerprint agrees with the retrieved fingerprint. If they agree with each other, the system asks the player to enter the number of tokens to be withdrawn, and if they disagree with each other, the system prompts the player for second fingerprint recognition. If the second fingerprint recognition fails, the system displays a withdrawal rejection message and rejects the withdrawal of the deposited tokens.

In this way, the second embodiment temporarily keeps tokens deposited by players and correctly manages tokens used in a amusement arcade.

The second embodiment retrieves fingerprint data according to personal information written in a card or entered through an input device, to quickly finish a player identification process.

Third embodiment

Figure 5:
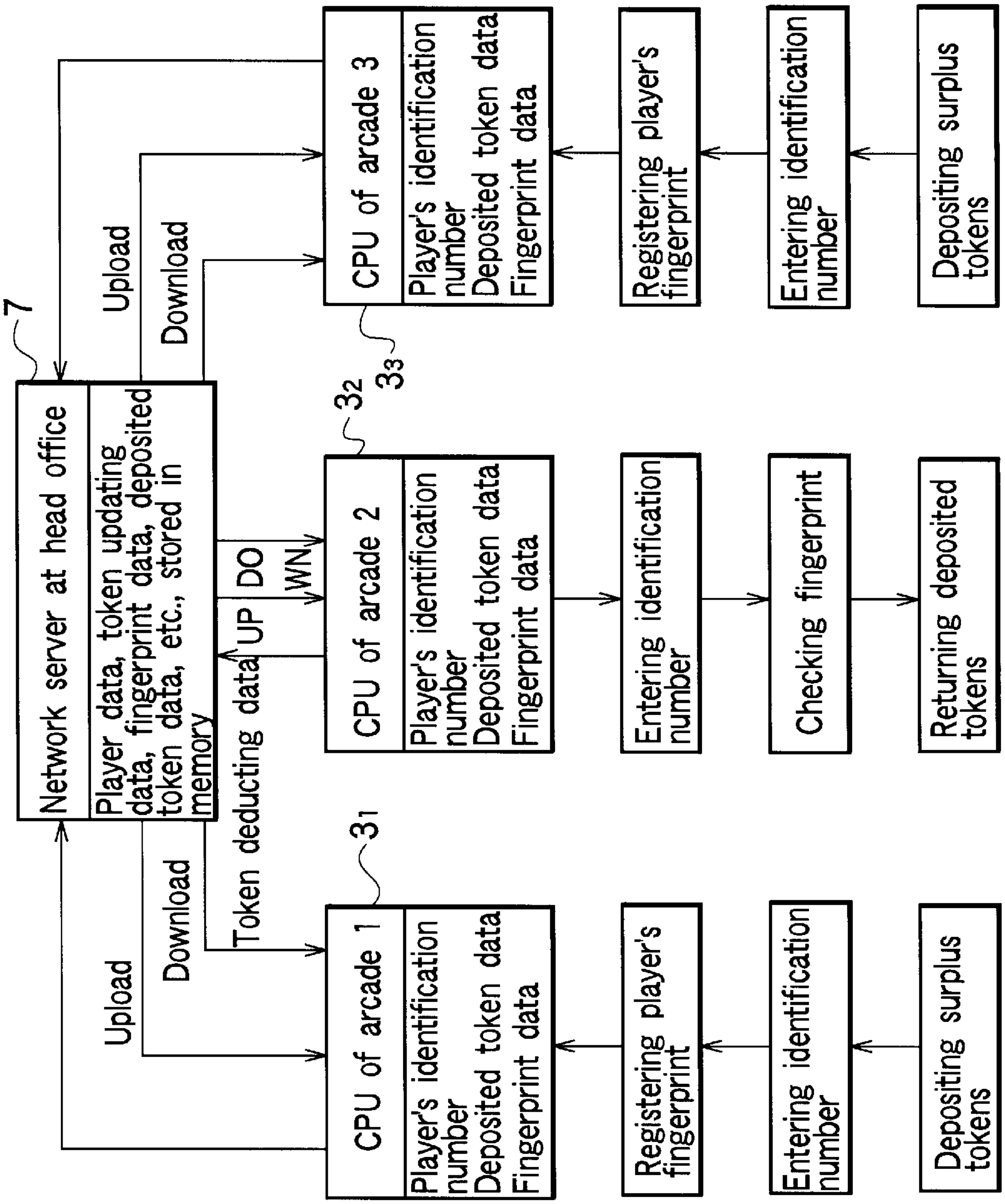
FIG. 5 schematically shows a network system according to a third embodiment of the present invention.

FIG. 5 schematically shows a network server 7 installed in a head office and connected to, through a wide area network (WAN), management computers installed in amusement arcades that are controlled by the head office. The third embodiment enables each amusement arcade not only to manage tokens within the amusement arcade but also to record and share information about tokens deposited by players at any amusement arcade.

To enable each amusement arcade to carry out player's fingerprint identification, the server 7 stores personal information of each player including a amusement arcade specifically related to the player, an identification number, a fingerprint, and the number of deposited tokens. The server 7 transmits data about each player to the management computer 3 of each amusement arcade. Any player who wants to withdraw his or her tokens at a amusement arcade enters his or her identification number and fingerprint at the amusement arcade. According to the entered identification number, the amusement arcade retrieves a corresponding fingerprint and checks to see if the entered fingerprint agrees with the retrieved fingerprint data. If they agree with each other, the amusement arcade allows the player to withdraw the tokens kept for the player. The number of the withdrawn tokens is informed to the server 7 through the WAN to update the number of tokens kept for the player. The updating information is also sent to the amusement arcades including the one where the player originally deposited tokens.

Consequently, each player can withdraw tokens kept for him or her at any one of the amusement arcades controlled by the server 7 of the head office. The third embodiment automatically updates the number of tokens kept for each player and totally manages tokens distributed through the amusement arcades.

The server 7 may periodically upload fingerprint data, etc., to the computer of each amusement arcade, to reduce a fingerprint recognition time.

In summary, the token management system for a amusement arcade according to the present invention enables a management computer of the amusement arcade to grasp the number of tokens held by each game machine or token dispensing machine in real time and correctly acquire the operating state of each machine and the number of tokens in stock, so that all machines may operate under optimum conditions.

The system of the present invention temporarily keeps tokens deposited by players with the use of the identification numbers and fingerprints of the players, to prevent the players from carrying tokens outside amusement arcades.

The system of the present invention identifies each player with a unique fingerprint to prevent players from illegally withdrawing tokens and enable players to withdraw deposited tokens at any amusement arcade, thereby expanding the range of amusement arcades where players can play games.

Any player is unable to withdraw deposited tokens unless his or her fingerprint agrees with a registered fingerprint. This prevents tokens to be transferred, bought, or sold among players. This results in preventing juvenile delinquency and promoting healthy society.

When returning deposited tokens to a player, the system of the present invention retrieves fingerprint data according to an identification number entered by the player, to shorten a fingerprint identification time and a player's waiting time.

Various modifications will become possible for those skilled in the art after receiving the teachings of the present disclosure without departing from the scope thereof.

What is claimed is:

1. A token management system for a amusement arcade, comprising:

wireless account means provided for each of game machines and token dispensing machines installed in the amusement arcade, for detecting the number of tokens or coins inserted into a slot of the machine and the number of tokens or coins returned to players through a return mouth of the machine and transmitting the detected numbers to wireless account means attached to a management computer of the amusement arcade, the wireless account means being provided with an identification number specific to the corresponding machine; and collecting means for collecting tokens and coins from the game machines and token dispensing machines, having a counter for counting the number of tokens or coins at each of the game machines and token dispensing machines and wireless account means provided with a function for comparing the counted number with count data transmitted from the corresponding machine, the system determining whether or not tokens or coins are excessive or insufficient for each of the game machines and token dispensing machines according to data transmitted from the machines and whether or not there are losses of tokens or coins according to data transmitted from the collecting means.

2. The system of claim 1, wherein:

each of the game machines and token dispensing machines is provided with a bar code representing an identification number specific to the machine;

the collecting means is provided with a bar-code reader; and the bar-code reader reads the identification number of a given game machine or token dispensing machine, and according to the read identification number, the collecting means automatically receives, through wireless communication, count data from the given machine.

3. A token management system for a amusement arcade, comprising:

token keep/return means having a function for accepting tokens deposited by a player, a function for temporarily keeping the accepted tokens, and a function for returning the kept tokens to the player;

game machines and token dispensing machines installed in the amusement arcade, each having wireless account means for detecting the number of tokens or coins inserted into a slot of the machine and the number of tokens or coins returned to players through a return mouth of the machine and transmitting the detected numbers to wireless account means attached to a management computer of the amusement arcade, the wireless account means being provided with an identification number specific to the corresponding machine; and the management computer connected to the token keep/return means through a communication link, for transmitting the identification number of any one of the game machines and token dispensing machines, receiving the number of tokens or coins counted at the machine that has the transmitted identification number, checking the received number, issuing an instruction to replenish the machine with tokens if the received number is below a predetermined level, and issuing an instruction to extract tokens from the machine if the received number is above a predetermined level.

4. The system of claim 3, wherein:

the token keep/return means is provided with input means for entering an identification number related to a player who deposits surplus tokens and fingerprint recognition means for scanning and reading a fingerprint of the player, the entered identification number and read fingerprint being transmitted to the management computer; and to return the deposited tokens to the player, the player enters the identification number through the input means and the system retrieves the fingerprint from the management computer according to the entered identification number, and if the retrieved fingerprint agrees with a fingerprint of the player presently read by the fingerprint recognition means, the system returns the deposited tokens to the player.

5. The system of claim 4, further comprising management computers installed in amusement arcades, respectively, the management computers being connected to one another through a communication network to centrally control tokens deposited by players to enable each player to deposit and receive tokens at any one of the amusement arcades through fingerprint identification.

* * * * *